(No Model.)
W. EYNON & W. SEAMAN.
PLANT OF MACHINERY FOR THE MANUFACTURE OF HORSESHOES.
No. 406,712. Patented July 9, 1889.
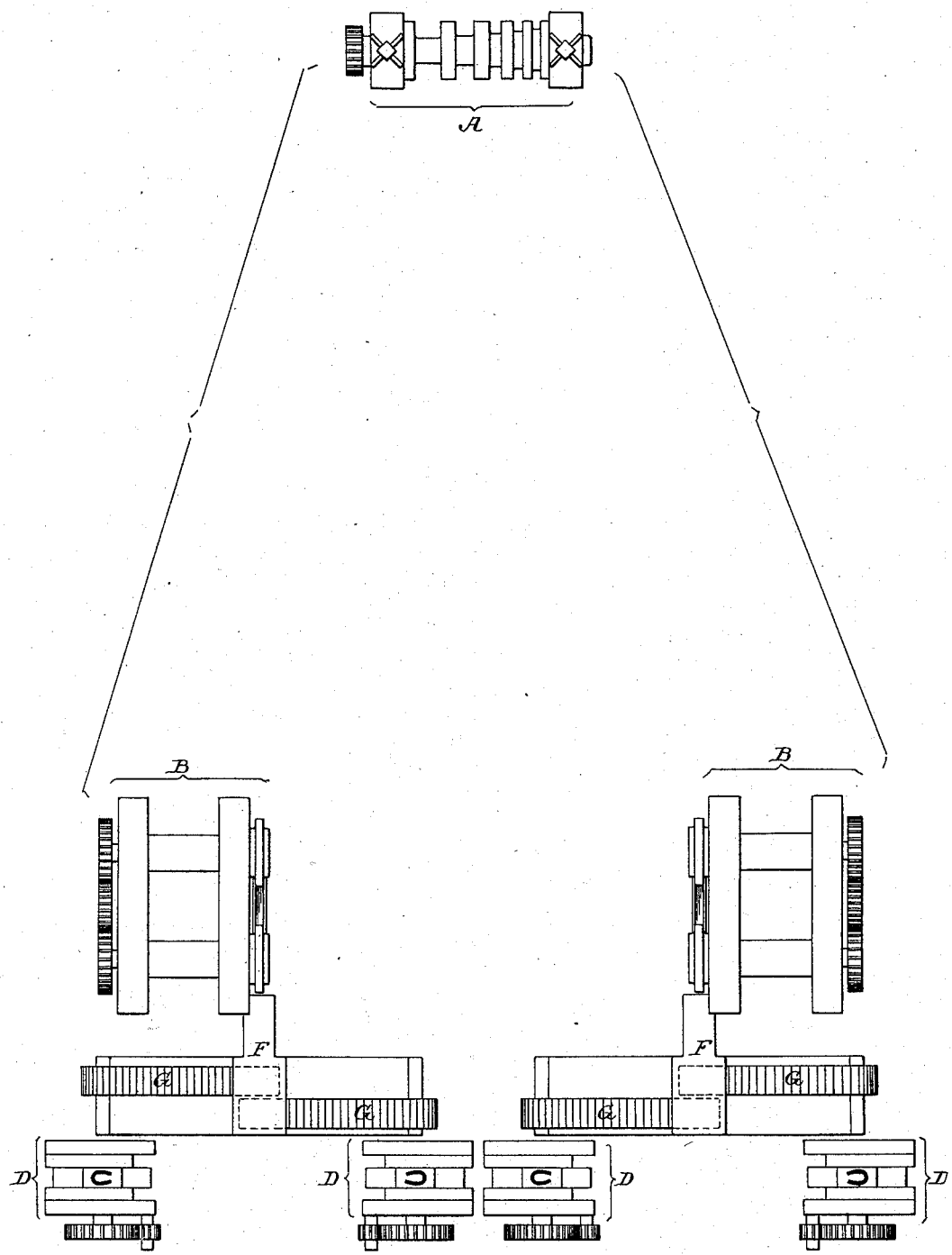

UNITED STATES PATENT OFFICE.

WILLIAM EYNON AND WILLIAM SEAMAN, OF WILMINGTON, DELAWARE.

PLANT OF MACHINERY FOR THE MANUFACTURE OF HORSESHOES.

SPECIFICATION forming part of Letters Patent No. 406,712, dated July 9, 1889.

Application filed February 15, 1889. Serial No. 300,036. (No model.)

*To all whom it may concern:*

Be it known that we, WILLIAM EYNON and WILLIAM SEAMAN, both citizens of the United States, and residents of Wilmington, New Castle county, Delaware, have invented certain Improvements in Apparatus for the Manufacture of Horseshoes, of which the following is a specification.

The object of our invention is to provide a plant for the manufacture of horseshoe-blanks creased and bent to the proper form without any reheating of the blanks or of the bar from which they are made after the first heating of the bar or of the bloom or billet from which such bar is produced; and this object we attain in the manner hereinafter set forth, reference being had to the accompanying drawing, which is a diagrammatic representation of a plant of machinery for carrying out our invention.

The reheating of the bars from which horseshoe-blanks are to be made is an expensive part of the process of making horseshoes as now conducted, as it necessitates more or less handling of the bar before it can be delivered to the machine for bending the blanks into horseshoe form, besides the expense of reheating. With the view or overcoming this expense of reheating and the handling incident thereto, we have devised a plant in which such reheating is rendered unnecessary, the preferred form of plant being that shown in the drawing, in which A represents a pair or train of rolls for forming a bar of the necessary width and thickness for the blanks from a bloom, slab, or billet in the usual way. In connection with this primary rolling-mill we prefer to use two supplementary rolling-mills B B, which are adapted for forming the necessary grooves or creases in the bar, and for severing the same into lengths or blanks, each suitable for one of the horseshoes to be produced, a mill of this character being shown in our application, Serial No. 293,108, filed December 10, 1888. For each of these supplementary or blanking mills we use two bending-machines D D, which may be of any desired character, although we prefer to construct them as set forth in a separate application for a patent bearing even date herewith, Serial No. 300,037, and between each blanking-mill and the bending-machines working in conjunction therewith we interpose a receiving-table F and a pair of transverse carrier belts or aprons G, one leading to the right toward one of the bending-machines and the other to the left toward the other machine.

The mill for rolling the blanks produces the same about twice as fast as either bending-machine could act upon the same; but by the use of two bending-machines with each blanking-mill the product of said blanking-mill can be readily disposed of, an attendant standing at a point adjacent to the receiving-table F and pushing the blanks as they are delivered from the mill, first onto one of the endless belts or aprons for delivery to one bending-machine, and then onto the other belt or apron for delivery to the other bending-machine.

Two of the blanking-mills B are used in connection with each bar-mill A for the same reason, the first bar produced being fed through one of the blanking-mills and the next through the other mill, so that ample time is afforded for the proper operation of each of the blanking-mills and the bending-machines used in connection therewith.

It will be evident that with machinery such as described no reheating of the bar is necessary, as the bar practically makes a continuous passage through the various machines of the series, and each blank when it reaches the bending-machine retains sufficient heat to permit of the proper bending of the blank by the machine without the necessity of exercising excessive power to effect such operation.

Although we prefer in all cases to employ traveling belts to carry the blanks from the receiving-table F to the bending-machines, tables on which the blanks can be moved transversely from said receiving-table to the bending-machines may be used in some cases, if desired.

Having thus described our invention, we claim and desire to secure by Letters Patent—

1. The within-described plant for the manufacture of horseshoes from a bar, said plant comprising a mill for rolling horseshoe-blanks from said bar, a pair of blank-bending machines located one at each side and in advance of said mill, a receiving-table at the delivery end of the mill, and feed belts or aprons extending laterally from said receiving-table, one to one bending-machine and the other to the opposite bending-machine, whereby the blanks delivered by the mill can be conveyed to the bending-machines alternately, substantially as specified.

2. The within-described plant for the manufacture of horseshoes from a bloom or billet, said plant comprising a bar-rolling mill, a pair of supplementary rolling-mills located one at each side and in advance of said bar-mill and constructed to form into separate horseshoe-blanks the bars delivered by said bar-mill, four blank-bending machines located one at each side and in advance of each blank-rolling mill, a receiving-table at the delivery end of each blanking-mill, and a pair of laterally-extending feed belts or tables for each receiving-table, one feed-belt extending to one bending-machine and the other to the opposite bending-machine, whereby the bar produced by the primary rolling-mill may be conveyed to the blanking-mills alternately and the blanks produced by each blanking-mill can be conveyed alternately to the bending-machines working in conjunction therewith, substantially as specified.

In testimony whereof we have signed our names to this specification in the presence of two subscribing witnesses.

WM. EYNON.
WM. SEAMAN.

Witnesses:
JAMES MAGAHERN,
BEN E. HEFFNER.